(12) United States Patent
Choi

(10) Patent No.: US 8,134,641 B2
(45) Date of Patent: Mar. 13, 2012

(54) METHOD AND APPARATUS FOR PROCESSING VIDEO SIGNAL

(75) Inventor: Young-hun Choi, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1490 days.

(21) Appl. No.: 11/487,458

(22) Filed: Jul. 17, 2006

(65) Prior Publication Data
US 2007/0035659 A1 Feb. 15, 2007

(30) Foreign Application Priority Data

Aug. 10, 2005 (KR) .................. 10-2005-0073321

(51) Int. Cl.
H04N 7/01 (2006.01)
H04N 11/20 (2006.01)
(52) U.S. Cl. .................................................. 348/446
(58) Field of Classification Search .......... None
See application file for complete search history.

(56) References Cited

U.S. PATENT DOCUMENTS

| | | | | |
|---|---|---|---|---|
| 4,724,487 A * | 2/1988 | Casey | ........................... | 348/567 |
| 5,309,236 A * | 5/1994 | Park | ........................... | 348/500 |
| 6,567,925 B1 * | 5/2003 | Kimura | ........................... | 713/502 |
| 2004/0070687 A1 | 4/2004 | Voltz et al. | | |

FOREIGN PATENT DOCUMENTS

| | | |
|---|---|---|
| CN | 1536876 A | 10/2004 |
| EP | 1164568 A1 | 12/2001 |
| GB | 2260460 A | 4/1993 |
| KR | 2000-0044742 A | 7/2000 |
| KR | 10-2003-0039728 A | 5/2003 |
| KR | 10-2004-0093264 A | 11/2004 |

* cited by examiner

*Primary Examiner* — Jefferey Harold
*Assistant Examiner* — Michael Teitelbaum
(74) *Attorney, Agent, or Firm* — Sughrue Mion, PLLC

(57) ABSTRACT

Methods and apparatuses for processing a video signal are provided, in which a video signal for an interlaced scanning mode is received that has a first field and a second field. Further, a determination is performed as to whether the first field and the second field are inverted with respect to each other, and the first field and the second field are recovered if the first field and the second field are determined to be inverted with respect to each other. Thus, a video signal can be generated for a progressive scanning mode on the basis of the recovered first and second fields. Thus, an odd field can be correctly distinguished from an even field, which are included in a video signal for an interlaced scanning mode.

11 Claims, 7 Drawing Sheets

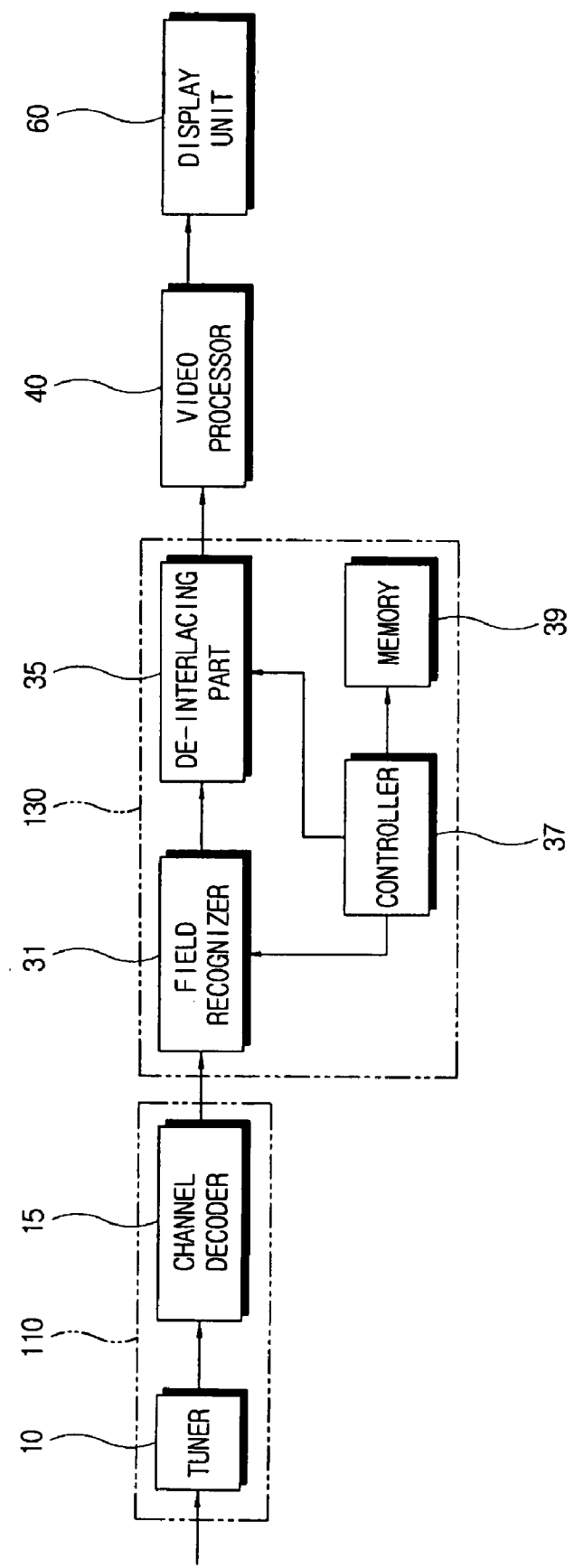

FIG. 5

| H-Resolution | Pixels | 1920 | 1920 |
|---|---|---|---|
| V-Resolution | Lines | 1080i | 1080i |
| | | | |
| H Frequency | kHz | 33.716 | 33.750 |
| V Frequency | Hz | 59.939 | 60.000 |
| | | | |
| Scan Type | - | Int | Int |
| H Sync Polarity | - | P | P |
| V Sync Polarity | - | P | P |
| | | | |
| Pixel Frequency | MHz | 74.175 | 74.250 |
| | | | |
| H Addressable | Pixels | 1920 | 1920 |
| H Right Border | Pixels | 0 | 0 |
| H Front Porch | Pixels | 88 | 88 |
| H Sync | Pixels | 44 | 44 |
| H Back Porch | Pixels | 148 | 148 |
| H Left Border | Pixels | 0 | 0 |
| H Total | Pixels | 2200 | 2200 |
| | | | |
| V Addressable | Lines | 1080i | 1080i |
| V Bottom Border | Lines | 0 | 0 |
| V FP(or Odd Field) | Lines | 2 | 2 |
| V FP(Even Field) | Lines | 2.5 | 2.5 |
| V Sync(or Odd Field) | Lines | 5 | 5 |
| V Sync(Even Field) | Lines | 5 | 5 |
| V BP(or Odd Field) | Lines | 15 | 15 |
| V BP(Even Field) | Lines | 15.5 | 15.5 |
| V Top Border | Lines | 0 | 0 |
| V Total | Lines | 1125 | 1125 |

METHOD AND APPARATUS FOR PROCESSING VIDEO SIGNAL

CROSS-REFERENCE TO RELATED APPLICATIONS

This application claims priority from Korean Patent Application No. 10-2005-0073321, filed Aug. 10, 2005 in the Korean Intellectual Property Office, the entire disclosure of which is incorporated herein by reference.

BACKGROUND OF THE INVENTION

1. Field of the Invention

Apparatuses and methods consistent with the present invention relate to processing a video signal, and more particularly, to processing a video signal in which a video signal for an interlaced scanning mode is converted into a video signal for a progressive scanning mode.

2. Description of the Related Art

In general, an interlaced scanning mode and a de-interlaced scanning mode (i.e., sequential scanning or progressive scanning) are widely used in processing video signals to be displayed as an image on a display unit. Recently, personal computers (PCs), high definition television (HDTVs) and the like are increasingly converting video signals for an interlaced scanning mode into a video signal for a progressive scanning mode to display images. The format conversion of the video signal from the interlaced scanning mode to the progressive scanning mode is referred to as "de-interlacing".

In the case of a video signal for the interlaced scanning mode, image information corresponding to one frame is divided in halves. That is, one frame is divided into an odd field and an even field. Thus, an interlaced signal with both the odd field and the even field has a frequency twice a progressive signal with a single frame.

In a video signal for the interlaced scanning mode, one frame includes the odd field, which has an odd horizontal synchronous signal line, and the even field, which has an even horizontal synchronous signal line. The de-interlacing creates one frame on the basis of at least one of the odd field and the even field, thereby generating a video signal for the progressive scanning mode.

A conventional video signal processing apparatus may abnormally distinguish the odd field from the even field included in the video signal for the interlaced scanning mode while performing the de-interlacing of an interlaced video signal. Thus, the video signal for the progressive scanning mode that is generated by the conventional video signal processing apparatus causes an error such as a double line to occur in a displayed image.

SUMMARY OF THE INVENTION

Accordingly, it is an aspect of the present invention to provide a method and an apparatus for processing a video signal, which can correctly distinguish an odd field from an even field, which are included in a video signal for an interlaced scanning mode.

Additional aspects of the Present invention will be set forth in part in the description which follows and, in part, will be obvious from the description, or may be learned by practice of the present invention.

The foregoing and other aspects of the present invention can be achieved by providing a method of processing a video signal, including receiving a video signal in an interlaced scanning mode format, which has a first field and a second field; determining whether the first field and the second field of the video signal in the interlaced scanning mode format which is received are inverted with respect to each other; recovering the first field and the second field if the first field and the second field are determined to be inverted with respect to each other; and generating a video signal in a progressive scanning mode format on the basis of the first field and the second field which are recovered.

According to another aspect of the present invention, the determining whether the first field and the second field are inverted with respect to each other comprises determining whether numbers of back porches and front porches of the first field and the second field are equal to a preset number.

According to another aspect of the present invention, the determining whether the first field and the second field are inverted with respect to each other further comprises determining whether a number of horizontal synchronous signals of a video signal which corresponds to each back porch and each front porch is equal to a preset number; and determining that the first field and the second field are inverted with respect to each other if the number of horizontal synchronous signals of the video signal, which corresponds to each back porch and each front porch, differs from the preset number.

According to another aspect of the present invention, the determining that the first field and the second field are inverted is performed per a time which is less than a period of a vertical synchronous signal of each field.

According to another aspect of the present invention, the determining whether the number of horizontal synchronous signals of the video signal, which corresponds to each back porch and each front porch, is equal to a preset number is repeated a predetermined number of times, and the first field and the second field are determined to be inverted with respect to each other if a total number of instances in which the number of horizontal synchronous signals of the video signal, which corresponds to each back porch and each front porch, differs from the preset number exceeds a maximum value.

According to another aspect of the present invention, one of the first field and the second field is an odd field of the video signal in the interlaced scanning mode format, and another of the first field and the second field is an even field.

According to another aspect of the present invention, in the odd field a horizontal synchronous signal and a vertical synchronous signal are in phase with each other at an initial time of the vertical synchronous signal of the video signal in the interlaced scanning mode format, and in the even field the horizontal synchronous signal and the vertical synchronous signal are out of phase by a half period of the horizontal synchronous signal at the initial time of the vertical synchronous signal of the video signal in the interlaced scanning mode format.

According to a further aspect of the present invention, an apparatus which processes a video signal is provided, including a signal receiver which receives a video signal in an interlaced scanning mode format, which has a first field and a second field; and a de-interlacing processor which determines whether the first field and the second field of the video signal in the interlaced scanning mode format which is received are inverted with respect to each other, recovers the first field and the second field if the first field and the second field are determined to be inverted with respect to each other and generates a video signal in a progressive scanning mode format based on the recovered first field and second field.

According to another aspect of the present invention, the de-interlacing processor determines whether the first field and the second field are inverted with respect to each other by determining whether numbers of back porches and front porches of the first field and the second field are equal to a preset number.

According to another aspect of the present invention, the de-interlacing processor determines whether a number of horizontal synchronous signals of a video signal, which correspond to each back porch and each front porch, are equal to the preset number, and determines that the first field and the second field are inverted with respect to each other if the number of horizontal synchronous signals of the video signal, which corresponds to each back porch and each front porch, differs from the preset number.

According to another aspect of the present invention, the de-interlacing processor determines that the first field and the second field are inverted per a time which is less than a period of a vertical synchronous signal of each field.

According to another aspect of the present invention, one of the first field and the second field is an odd field of the video signal in the interlaced scanning mode format, and another of the first field and the second field is an even field of the video signal in the interlaced scanning mode format.

According to another aspect of the present invention, in the odd field a horizontal synchronous signal and a vertical synchronous signal are in phase with each other at an initial time of the vertical synchronous signal of the video signal in the interlaced scanning mode format, and in the even field the horizontal synchronous signal and the vertical synchronous signal are out of phase by a half period of the horizontal synchronous signal at the initial time of the vertical synchronous signal of the video signal in the interlaced scanning mode format.

According to another aspect of the present invention, the apparatus further comprises a display unit, wherein the de-interlacing processor outputs the video signal of the progressive scanning mode to be displayed as an image on the display unit.

BRIEF DESCRIPTION OF THE DRAWINGS

The above and other aspects of the present invention will become apparent and more readily appreciated from the following description of the exemplary embodiments, taken in conjunction with the accompany drawings of which:

FIG. 1 is a control block diagram of a video signal processing apparatus according to an exemplary embodiment of the present invention;

FIG. 5 is a table showing timing of an input video signal that has a resolution of 1080i.

DETAILED DESCRIPTION OF EXEMPLARY EMBODIMENTS OF THE INVENTION

Figure 2A:
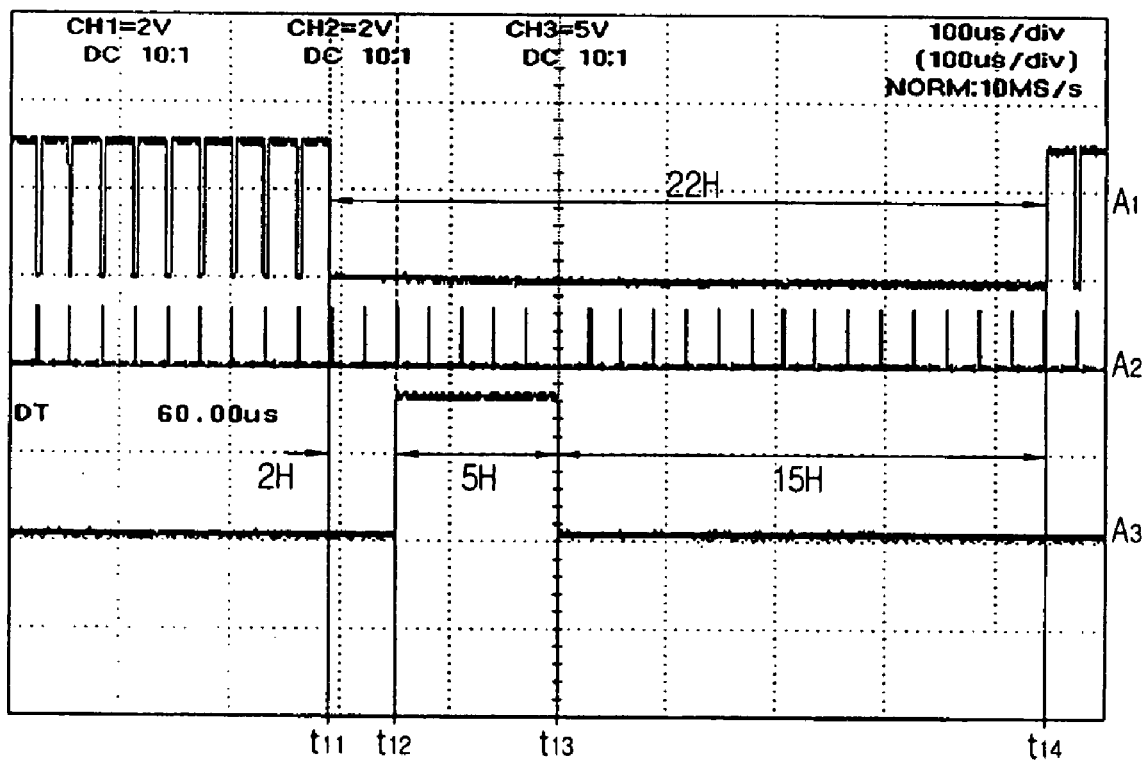
FIGS. 2A, 2B, 3A and 3B are timing diagrams of an input video signal.

Reference will now be made in detail to the exemplary embodiments of the present invention, examples of which are illustrated in the accompanying drawings, wherein like reference numerals refer to like elements throughout. The exemplary embodiments are described below in order to explain the present invention by referring to the figures.

As shown in FIG. 1, a video signal processing apparatus according to an exemplary embodiment of the present invention includes a signal receiver 110 to receive a video signal; and a de-interlacing processor 130 that converts a video signal from an interlaced scanning mode to a progressive scanning mode when the received video signal is based on the interlaced scanning mode. Further, the video signal processing apparatus according to an exemplary embodiment of the present invention includes a video processor 40 to process a video signal for the progressive scanning mode that is generated by the de-interlacing processor 130; and a display unit 60 to display an image based on a video signal processed by the video processor 40.

The signal receiver 110 receives an external video signal, and includes a tuner 10 and a channel decoder 15. The signal receiver 110 receives a video signal from an external source such as a broadcasting station, a digital versatile disc (DVD) player, a camcorder, etc. For example, when the external source is a broadcasting station, the signal receiver 110 may include the tuner 10. Here, the tuner 10 is tuned to a video signal having a frequency band corresponding to a tuning control signal among the video signals received through an antenna or other broadcast signal input.

That is, the tuner 10 may select a video signal corresponding to a channel to be displayed on the display unit 60 among the plurality of video signals received through the antenna or other broadcast signal input, thereby outputting the selected video signal to the channel decoder 15. Then, the channel decoder 15 decodes a digital video signal detected from the video signal received by the tuner 10.

The de-interlacing processor 130 converts the video signal for the interlaced scanning mode into a video signal for the progressive scanning mode when the received video signal is based on the interlaced scanning mode. The de-interlacing processor 130 includes a field recognizer 31; a de-interlacing part 35 to convert the video signal from the interlaced scanning mode to the progressive scanning mode; a controller 37 to control the field recognizer 31 and the de-interlacing part 35; and a memory 39.

The field recognizer 31 distinguishes an odd field and an even field, which are included in the video signal for the interlaced scanning mode.

According to an exemplary embodiment of the present invention, the field recognizer 31 can recognize the field according to the number of horizontal synchronous signals A2 that correspond to a back porch and a front porch of a video signal. The field recognizer 31 regards the field as the odd field when the horizontal synchronous signal A2 and a vertical synchronous signal A3 start in the same phase. Further, the field recognizer 31 regards the field as the even field when the phase of the vertical synchronous signal A3 is delayed from that of the horizontal synchronous signal A2 by a half period of the horizontal synchronous signal A2.

FIG. 5 is a table showing timing information of input video signal in the 1080i format. Referring to FIG. 5, in the odd field, the horizontal synchronous signal A2 has 2 lines corresponding to the front porch and 15 lines corresponding to the back porch. In the even field, the horizontal synchronous signal A2 has 2.5 lines corresponding to the front porch and 15.5 lines corresponding to the back porch. At this time, the field recognizer 31 recognizes the number of horizontal synchronous signals A2 corresponding to the front porch and the back porch in each field.

Here, the field recognizer 31 cannot recognize the line corresponding to "0.5", so that it regards the line numbers of the horizontal synchronous signal A2 corresponding to each front porch of the odd and even fields as "2", and regards the line numbers of the horizontal synchronous signal A2 corresponding to each back porch of the odd and even fields as "15".

The de-interlacing part 35 applies de-interlacing to the video signal for the interlaced scanning mode, thereby changing it from the interlaced format into the video signal for the progressive scanning mode. The de-interlacing part 35 can perform the de-interlacing by various methods. For example, the de-interlacing part 35 may include at least one of an inter-field part (not shown) to create one frame by uniting the odd and even fields, and an intra-field part (not shown) to create one frame by doubling either lines of the odd or even field.

The controller 37 can distinguish the odd field from the even field according to recognition results of the field recognizer 31. Meanwhile, the controller 37 determines that the odd and even fields are inverted with respect to each other when the line numbers of the horizontal synchronous signal A2, which correspond to the front and back porches of each field, are not equal to the values of "2" and "15" that are stored in the memory 39, respectively.

For example, the controller 37 determines that the odd and even fields are inverted with respect to each other when there is a difference of at least "1" between the number stored in the memory 39 and the line number of the horizontal synchronous signal A2 corresponding to at least one of the front and back porches of each field. Therefore, the controller 37 performs the de-interlacing by regarding the recognized odd field as the even field and regarding the recognized even field as the odd field.

The controller 37 estimates the characteristics of an image on the basis of information of an input video signal. For example, the controller 37 determines whether an image is a still picture or a moving picture. On the basis of the estimated results, the controller 37 determines whether to perform weaving or blending in consideration of the characteristics of the video signal, and thus controls the de-interlacing part 35. The controller 37 receives information about a change rate between two successive fields. Thus, the controller 37 determines an image to be a still picture when the change rate is lower than a predetermined value, and determines an image to be a moving picture when the change rate is higher than a predetermined value.

The video processor 40 processes the video signal for the progressive scanning mode, which is obtained by the de-interlacing processor 130, to have a format that is displayable on the display unit 60.

The display unit 60 includes a display module (not shown) on which an image is displayed, and a module driver (not shown) that drives the display module to display an image by processing the video signal that is output from the video processor 40. Here, the display module according to an exemplary embodiment of the present invention may include a digital light processing (DLP), a liquid crystal display (LCD), a plasma display panel (PDP), etc.

When the DLP is used as the display module, the module driver may include an optical engine. When the LCD is used as the display module, the module driver may include a printed circuit board to convert a signal output from the video processor 40 into a data signal and a gate signal. Likewise, the module driver of the display unit 60 may include various configurations corresponding to the display modules.

Figure 2B:
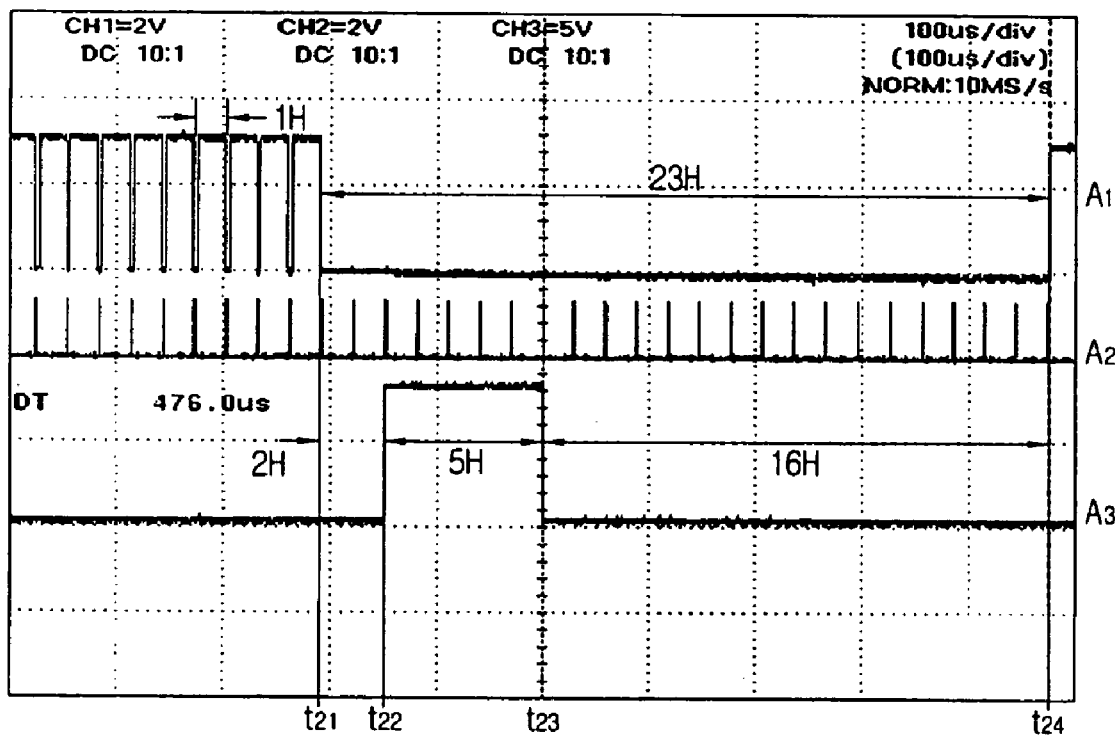

FIG. 2A is a timing diagram of a video signal for the odd field when it is normally recognized, and FIG. 2B is a timing diagram of a video signal when a video signal for an even field is abnormally recognized as the video signal for the odd field.

The video signal includes the vertical synchronous signal A3, the horizontal synchronous signal A2, a data enable signal A1, a pixel clock signal, an RGB signal, etc.

In the normal odd field, the horizontal synchronous signal A2 is "22" lines, corresponding to a blanking section from t11 to t14 of the data enable signal A1 (refer to FIG. 2A). In the normal even field, the horizontal synchronous signal A2 is "23" lines, corresponding to a blanking section from t31 to t34 of the data enable signal A1 (refer to FIG. 3A).

The field recognizer 31 distinguishes the odd field from the even field according to whether the horizontal synchronous signal A2 and the vertical synchronous signal A3 are started at the same phase. For example, the field recognizer 31 recognizes the video signal for the odd field when the horizontal synchronous signal A2 and the vertical synchronous signal A3 are started at the same phase t12 (refer to FIG. 2A). At this time, two horizontal synchronous signals A2 correspond to the front porches from t11 to t12, and fifteen horizontal synchronous signals A2 correspond to the back porches from t13 to t14.

Meanwhile, in the video signal shown in FIG. 2B, the horizontal synchronous signal A2 and the vertical synchronous signal A3 are started at the same phase t21. Therefore, the field recognizer 31 recognizes the field of the video signal shown in FIG. 2B as the odd field. However, the horizontal synchronous signal A2 is "23" lines, corresponding to the blanking section from t21 to t24 of the data enable signal A1, and horizontal synchronous signal A2 belongs to the even field, not to the odd field as incorrectly recognized. Thus, the video signal of FIG. 2B is output from the external source at abnormal timing, so that the field recognizer 31 regards the even field as the odd field by mistake.

In this case, the horizontal synchronous signal A2 is counted two times in the front porch from t21 to t22 and counted sixteen times in the back porch from t23 to t24. Here, the controller 37 determines that the odd field and the even field are inverted with respect to each other because the number of the horizontal synchronous signals A2 corresponding to one of the front and back porches is higher than the normal numbers "2" and "15" by at least "1". Thus, the controller 37 controls the de-interlacing part 35 and the field recognizer 31 to perform the de-interlacing by regarding the video signal of FIG. 2B, which was incorrectly recognized as the odd field, as the even field.

Figure 3A:
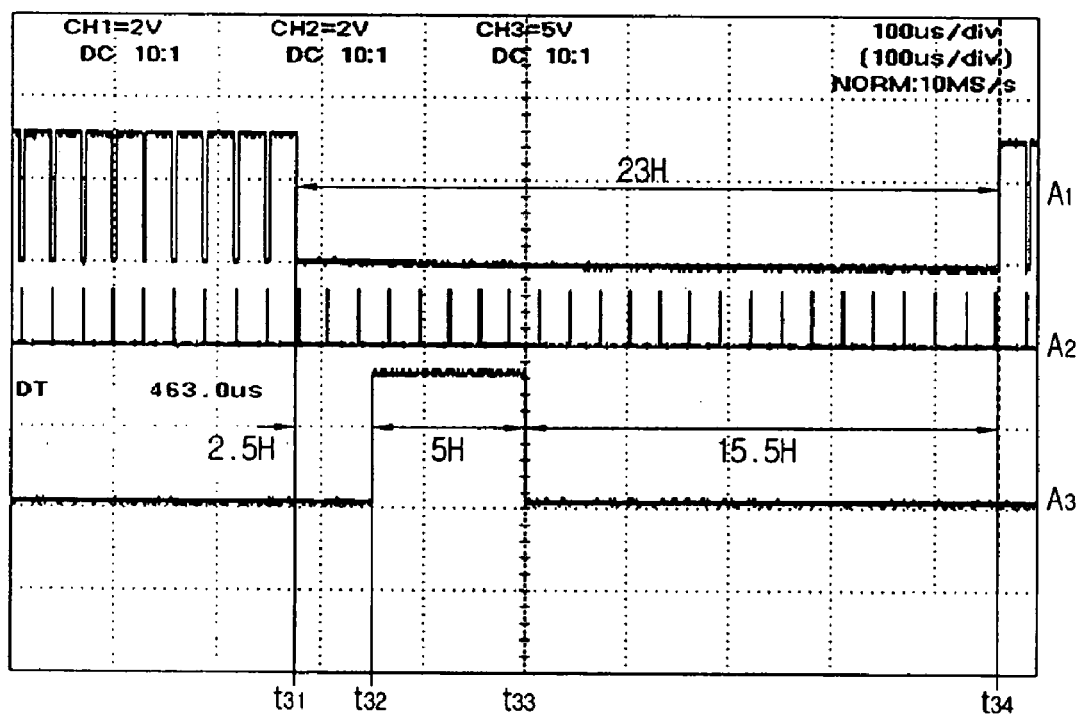
Figure 3B:
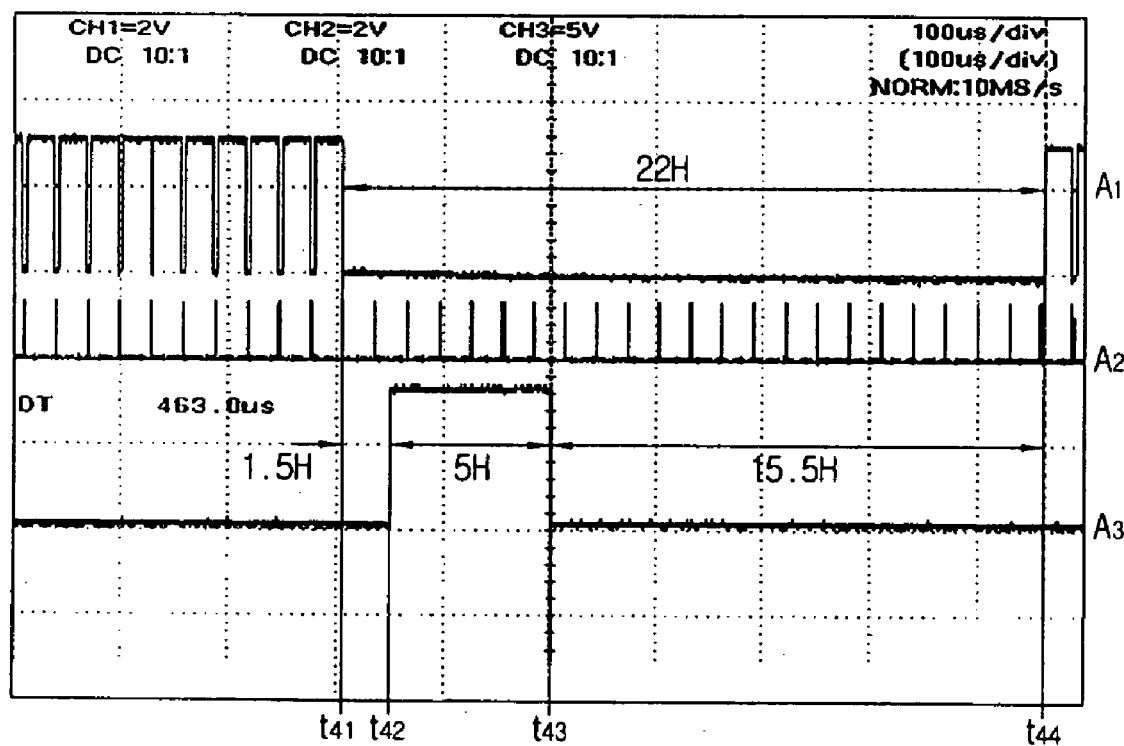

FIG. 3A is a timing diagram of a video signal for the even field when it is normally recognized, and FIG. 3B is a timing diagram of a video signal when it is abnormally recognized as the even field, in which the original field of the video signal is the odd field.

In the normal even field, the horizontal synchronous signal A2 is "23" lines corresponding to a blanking section from t31 to t34 of the data enable signal A1 (refer to FIG. 3A).

The field recognizer 31 distinguishes the odd field from the even field according to whether the horizontal synchronous signal A2 and the vertical synchronous signal A3 are started at the same phase. For example, the field recognizer 31 recognizes the video signal for the even field because the vertical synchronous signal A3 is started at a time t32 while leaving a phase difference of half of the horizontal synchronous signal A2 from the horizontal synchronous signal A2. At this time, two and a half horizontal synchronous signals A2 correspond to the front porches from t31 to t32, and fifteen and a half horizontal synchronous signals A2 correspond to the back porches from t33 to t34.

Meanwhile, in the video signal shown in FIG. 3B, the horizontal synchronous signal A2 and the vertical synchronous signal A3 are started at a time t41 while leaving a phase difference of half of the horizontal synchronous signal A2 therebetween. Therefore, the field recognizer 31 recognizes the field of the video signal shown in FIG. 3B as the even field.

However, the number horizontal synchronous signals A2 which corresponds to the blanking section from t41 to t44 of the data enable signal A1 is "22", and horizontal synchronous signal A2 belongs to the odd field. That is, the video signal of FIG. 3B is outputted from the external source at abnormal timing, so that the field recognizer 31 regards the odd field as the even field by mistake.

In this case, the horizontal synchronous signal A2 is counted once in the front porch from t41 to t42 and counted fifteen times in the back porch from t23 to t24. Here, the controller 37 determines that the odd field and the even field are inverted with respect to each other because the number of the horizontal synchronous signals A2 corresponding to one of the front and back porches are higher than the normal numbers "2" and "15" by at least "1". Thus, the controller 37 controls the de-interlacing part 35 and the field recognizer 31 to perform the de-interlacing by regarding the video signal of FIG. 3B, which was recognized as the even field, as the odd field.

In the meantime, a video signal processing apparatus according to an exemplary embodiment of the present invention operates as follows.

Figure 4:
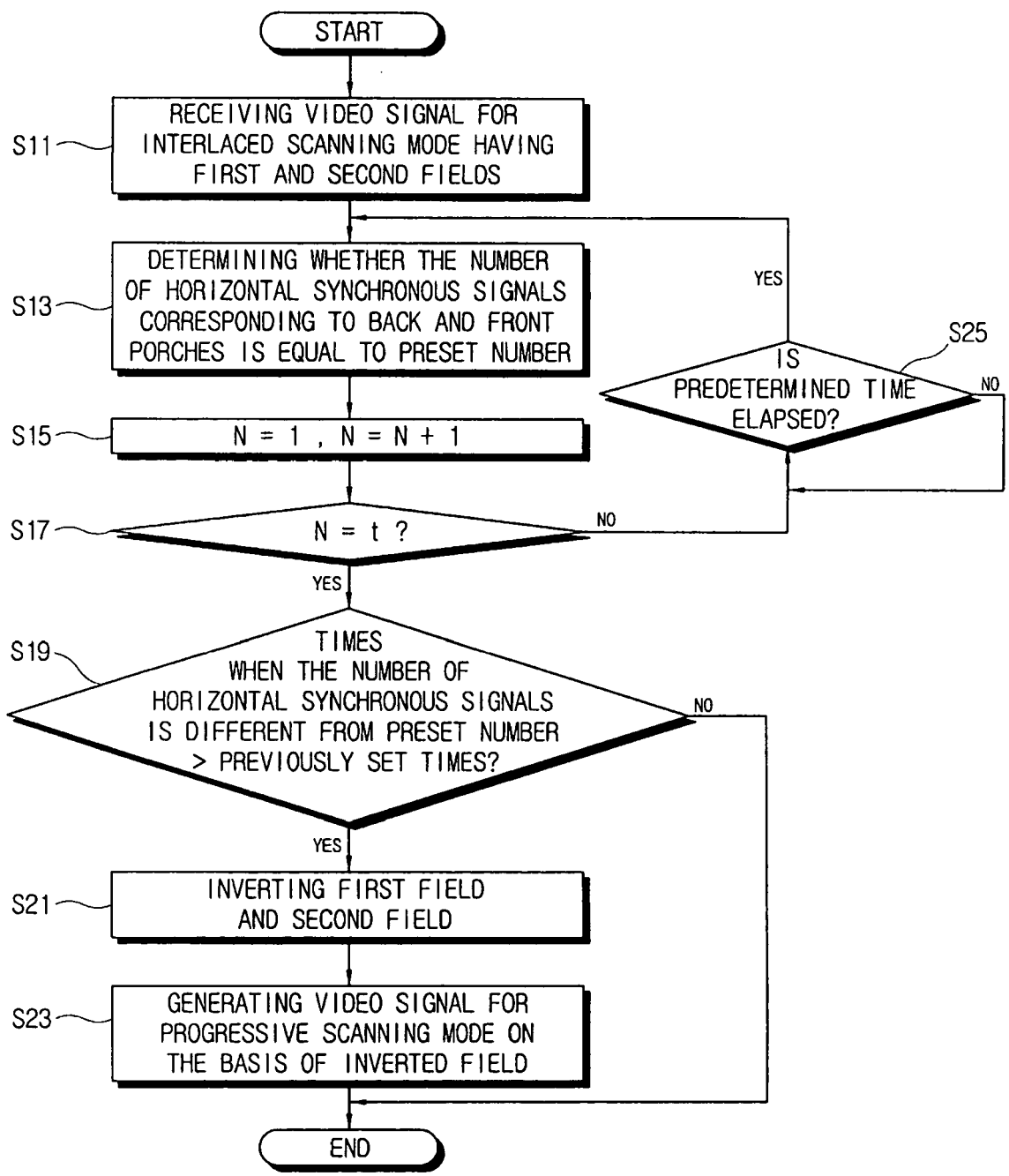
FIG. 4 is a control flowchart of a video signal processing apparatus according to an exemplary embodiment of the present invention.

Referring to FIG. 4, at operation S11, the video signal processing apparatus according to an exemplary embodiment of the present invention receives a video signal from the external source. At this time, the controller 37 determines whether the received video signal includes the odd field and the even field based on the interlaced scanning mode. At operation S13, the de-interlacing processor 130 determines the respective numbers of horizontal synchronous signals A2 that correspond to the back porch and front porch in the odd field and the even field, and determines whether the number of horizontal synchronous signals A2 is equal to the preset number stored in the memory 39.

Further, at operations S15 and S17, the controller 27 controls the field recognizer 31 to repetitively determine whether the number of horizontal synchronous signals A2 is equal to the preset number stored in the memory 39. Here, the repetitive determination is just needed to obtain higher accuracy. Substantially, one determination is enough.

At operation 25, the controller 37 determines whether the number of horizontal synchronous signals A2 is equal to the preset number stored in the memory 39 per predetermined period of time. Further, the controller 37 may determine whether the number of horizontal synchronous signals A2 is equal to the preset number stored in the memory 39 per a predetermined period of time that is shorter than the period of the vertical synchronous signal A3, but the period of determination is not limited thereto.

At operation S19, when the number of instances in which the number of horizontal synchronous signals A2, which correspond to the back and front porches, differs from the preset number stored in the memory 39 is smaller than a predetermined number of instances, the controller 37 determines that the even field and the odd field are normal. On the other hand, when the number of instances in which the number of horizontal synchronous signals A2 corresponding to the back and front porches differs from the preset number is greater than the predetermined number of instances, the controller 37 determines that the even field and the odd field are abnormally inverted with respect to each other.

For example, suppose that the number of horizontal synchronous signals A2 corresponding to each front porch of the odd field and the even field is "2" and the number of horizontal synchronous signals A2 corresponding to each back porch is "15", the values for which are previously stored in the memory 39. Further, suppose that one period of the horizontal synchronous signal A2 is of 11 msec. Also, suppose that at operation S17, there are ten instances in which the number of horizontal synchronous signals A2 is determined to be equal to the preset number stored in the memory 39; at the operation S19 the previously set number of instances is four, and at the operation S25 the predetermined time is 10 msec.

Under these conditions, at operation S13, the number of horizontal synchronous signals A2 corresponding to the front and back porches of the odd field is determined and then determined again after the lapse of 10 msec, which is repeated ten times. At this point, when the horizontal synchronous signal A2 is not equal to the preset number is repeated five times among ten times, the controller 37 determines that the even field and the odd field are inverted with respect to each other because the previously set number of instances (i.e., four instances) is exceeded.

When it is determined that the even field and the odd field are inverted, at operation S21 the controller 37 inverts the even field and the odd field with respect to each other as their original fields, thereby recovering the original fields. Then, the controller 37 controls the de-interlacing part 35 to generate a video signal for the progressive scanning mode on the basis of the recovered original even and odd fields.

As described above, aspects of the present invention provide a method and an apparatus for processing a video signal, which can correctly distinguish an odd field from an even field, which are included in a video signal for an interlaced scanning mode, thereby preventing the video signal for the progressive scanning mode generated by the abnormal combination of the odd and even fields from causing an error such as a double line to occur in a displayed image.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of processing a video signal, the method comprising:
   receiving a video signal in an interlaced scanning mode format, which has a first field and a second field;
   determining whether the first field and the second field of the video signal in the interlaced scanning mode format which is received are inverted with respect to each other;
   recovering the first field and the second field if the first field and the second field are determined to be inverted with respect to each other; and
   generating a video signal in a progressive scanning mode format based on the first field and the second field which are recovered;
   wherein the determining whether the first field and the second field are inverted with respect to each other comprises determining whether numbers of back porches and front porches of the first field and the second field are equal to a preset number;
   wherein the numbers of front porches equals a number of horizontal synchronous signals of a video signal during a time beginning when a data enable signal changes from a first enable state to a second enable state and ending when a vertical synchronous signal changes from a first synch state to a second synch state, and
   wherein the numbers of back porches equals a number of horizontal synchronous signals of a video signal during a time beginning when the vertical synchronous signal changes from the second synch state to the first synch state and ending when the data enable signal changes from the second enable state to the first enable state.

2. The method according to claim 1, wherein the determining that the first field and the second field are inverted is performed per a time which is less than a period of a vertical synchronous signal of each field.

3. The method according to claim 1, wherein the determining whether the number of horizontal synchronous signals of the video signal, which corresponds to each back porch and each front porch, is equal to a preset number is repeated a predetermined number of times, and the first field and the second field are determined to be inverted with respect to each other if a total number of instances in which the number of horizontal synchronous signals of the video signal, which corresponds to each back porch and each front porch, differs from the preset number exceeds a maximum value.

4. The method according to claim 1, wherein one of the first field and the second field is an odd field of the video signal in the interlaced scanning mode format, and another of the first field and the second field is an even field of the video signal in the interlaced scanning mode format.

5. The method according to claim 4, wherein in the odd field a horizontal synchronous signal and a vertical synchronous signal are in phase with each other at an initial time of the vertical synchronous signal of the video signal in the interlaced scanning mode format, and in the even field the horizontal synchronous signal and the vertical synchronous signal are out of phase by a half period of the horizontal synchronous signal at the initial time of the vertical synchronous signal of the video signal in the interlaced scanning mode format.

6. An apparatus for processing a video signal, the apparatus comprising:
a signal receiver which receives a video signal in an interlaced scanning mode format, which has a first field and a second field; and
a de-interlacing processor which determines whether the first field and the second field of the video signal in the interlaced scanning mode format which is received are inverted with respect to each other, recovers the first field and the second field if the first field and the second field are determined to be inverted with respect to each other, and generates a video signal in a progressive scanning mode based on the first field and the second field which are recovered;
wherein the de-interlacing processor determines whether the first field and the second field are inverted with respect to each other by determining whether numbers of back porches and front porches of the first field and the second field are equal to a preset number;
wherein the numbers of front porches equals a number of horizontal synchronous signals of a video signal during a time beginning when a data enable signal changes from a first enable state to a second enable state and ending when a vertical synchronous signal changes from a first synch state to a second synch state, and
wherein the numbers of back porches equals a number of horizontal synchronous signals of a video signal during a time beginning when the vertical synchronous signal changes from the second synch state to the first synch state and ending when the data enable signal changes from the second enable state to the first enable state.

7. The apparatus according to claim 6, wherein the de-interlacing processor determines that the first field and the second field are inverted per a time which is less than a period of a vertical synchronous signal of each field.

8. The apparatus according to claim 6, wherein the de-interlacing processor repeatedly determines for a predetermined number of time whether the number of horizontal synchronous signals of the video signal, which corresponds to each back porch and each front porch, is equal to a preset number, and the first field and the second field are determined to be inverted with respect to each other if a total number of instances in which the number of horizontal synchronous signals of the video signal, which corresponds to each back porch and each front porch, differs from the preset number exceeds a maximum value.

9. The apparatus according to claim 6, wherein one of the first field and the second field is an odd field of the video signal in the interlaced scanning mode format, and another of the first field and the second field is an even field of the video signal in the interlaced scanning mode format.

10. The apparatus according to claim 9, wherein in the odd field a horizontal synchronous signal and a vertical synchronous signal are in phase with each other at an initial time of the vertical synchronous signal of the video signal in the interlaced scanning mode format, and in the even field the horizontal synchronous signal and the vertical synchronous signal are out of phase by a half period of the horizontal synchronous signal at the initial time of the vertical synchronous signal of the video signal in the interlaced scanning mode format.

11. The apparatus according to claim 6, further comprising a display unit,
wherein the de-interlacing processor outputs the video signal of the progressive scanning mode to be displayed as an image on the display unit.

* * * * *